United States Patent Office.

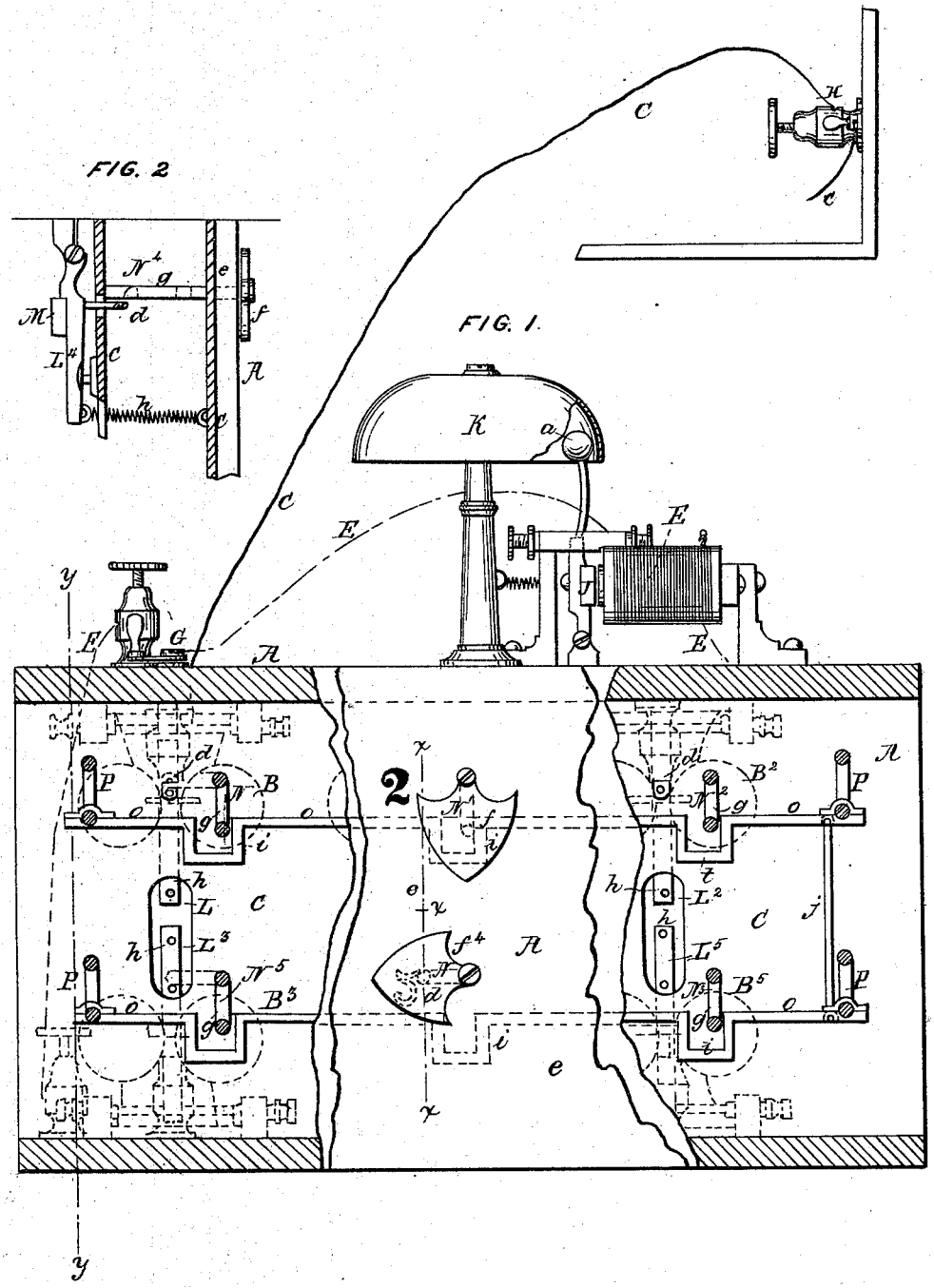

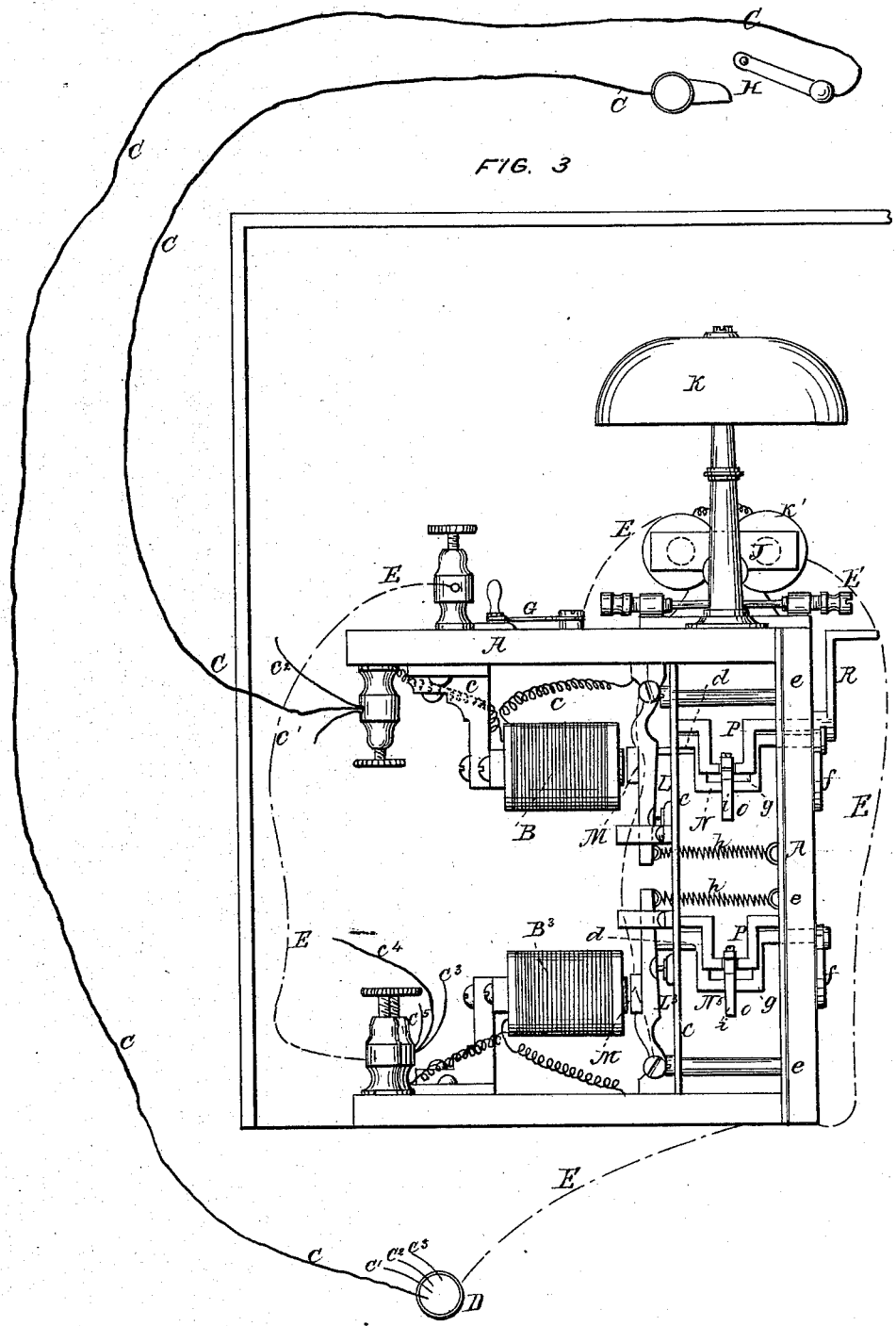

CHARLES S. NOÉ, OF BERGEN POINT, NEW JERSEY.

Letters Patent No. 100,792, dated March 15, 1870.

IMPROVED HOTEL AND BURGLAR-ALARM.

The Schedule referred to in these Letters Patent and making part of the same.

*To all whom it may concern:*

Be it known that I, CHARLES S. NOÉ, of Bergen Point, in the county of Hudson, and State of New Jersey, have invented a new and Improved Hotel and Burglar-Alarm; and I do hereby declare that the following is a full, clear, and exact description thereof, which will enable others skilled in the art to make and use the same, reference being had to the accompanying drawings forming part of this specification, in which—

Figure 1 represents a front elevation, partly in section, of my improved hotel and burglar-alarm.

Figure 2 is a detail vertical transverse section of the same, taken on the plane of the line $x\ x$, fig. 1.

Figure 3 is a vertical transverse section of the same, taken on the plane of the line $y\ y$, fig. 1.

Similar letters of reference indicate corresponding parts.

The object of this invention is to construct an electric hotel and burglar-alarm, which, from a single battery, will charge a suitable number of wires, of which each will serve to operate the alarm when closed by a suitable switch, besides indicating on a dial or other plate the particular switch which was moved to produce the current.

The invention consists in the general combination and arrangement of machinery for operating and connecting the several parts, and particularly in the employment of certain crank-shafts for operating the indicators, all as hereinafter more fully described.

A in the drawing represents the frame, on and in which my improved apparatus is set up.

To this frame are secured a suitable number of electro-magnets, B $B^1$ $B^2$ $B^3$, &c., which are preferably set up in the same plane, as is clearly indicated in fig. 3.

Each of these electro-magnets is by a positive wire, C $C^1$ $C^2$ $C^3$, &c., separately connected with an electric battery, D, and with the same battery all the said electro-magnets are connected by a negative wire, E.

The negative wire passes from the battery to an electro-magnet, F, thence to a switch, G, and from there to the electro-magnets B $B^1$, &c., successively.

Each of the positive wires contains a switch, H.

When the apparatus is to operate, the switch G must first be closed, in order to unite the negative wire. When, then, one of the switches H is closed, the current will be established, and the electro-magnet B $B^1$, &c., to which such switch pertains, will attract its armature. The electro-magnet F will also attract its armature J.

If the switch of the wire $C^2$ be closed, the electro-magnet $B^2$ will be charged, and none of the others, B $B^1$ $B^3$, &c. The electro-magnet F will, however, be charged whenever either one of the switches C $C^1$, &c., is closed.

The armature J carries a clapper, $a$, which, whenever the magnet F is charged to attract J, strikes against a bell, K, to sound an alarm.

In front of each electro-magnet B $B^1$ $B^2$ $B^3$ $B^4$, &c., is pivoted to the frame A a lever, L $L^1$ $L^2$ $L^3$, &c., carrying an armature-plate, M.

From each lever L $L^1$, &c., projects outward through a vertical plate, $c$, of the frame, a pin, $d$.

Between the plate $c$ and the front plate $e$ of the frame A are hung as many crank-axles, N $N^1$ $N^2$, &c., as there are electro-magnets B $B^1$, &c., one in front of each electro-magnet.

The outer end of each crank-axle carries in front of the plate $e$ a shield or pointer, $f$, which hangs down when the crank $g$ of such axle hangs down, and which is swung up (as the lower one in fig. 1) when the crank is elevated.

By means of a spring, $h$, each armature-lever L $L^1$, &c., is drawn away from its electro-magnet, and toward the plate $e$. When the crank of an axle, N $N^1$, &c., is swung up into a horizontal position, its inner rounded or beveled arm passes by the end of the pin $d$, and when over the same, the spring $h$ draws the said pin under the crank, so that the latter will rest thereon, as is clearly shown in fig. 2. The shield or pointer $f$ will then also be held horizontal. When the armature pertaining to such elevated shield is attracted by its electro-magnet the pin $d$ is drawn inward and ceases to support the crank, and the shield will then, by its own weight, drop down to be suspended vertically. The pointer will thus indicate which one of the switches H was closed.

To facilitate the understanding of the apparatus, the several pointers may carry, or, when elevated, cover figures, letters, or other marks.

When the apparatus is to be prepared for action all the cranks $g$ and pointers $f$ should be elevated. This may be done separately, but in order to save time it is best to provide means for raising all at once.

For this purpose I have provided one or more bars, O O, which are with their ends suspended from crank-axles, P P, and which contain cranks or jaws, $i\ i$, that embrace but do not hold the suspended cranks $g$.

If the electro-magnets B $B^1$, &c., are arranged in two horizontal rows, as shown, there must be two bars O, and in all cases one for each row.

When two or more are used they must be connected by rods, $j$, to move simultaneously.

When, by means of a crank-lever, R, on one of the axles P, the latter is swung, it will cause all the bars O to be swung, and to strike with their jaws $i$ the cranks $g$, which they elevate, each and all, depositing them upon the pins $d$. When then one positive wire is closed to close the current, the axle and shield pertaining to it will be released to drop, and the shield will then indicate which particular switch was closed.

For hotels, the frame A with the electro-magnets is set up in the office, and a positive wire carried to each room, each room having a switch, H.

The clerk in the office has the apparatus under control by means of the switch G. Not until that is closed can the currents be established by the parties in the several rooms.

The clerk also elevates all the shields, by means of the lever R.

When one of the guests closes the switch in his room the current will be established, and the shield $f$ dropped, while at the same time the bell is struck to call the clerk's attention to the apparatus.

After due notice has been taken of the call, the lever R is used to re-elevate the shield, and to set the apparatus for new action.

For burglar-alarms the construction is about the same, with the only exception that the switches are formed on doors, windows, or shutters, the frame A being set up in a bed-room. Whenever the alarm is sounded the pointer will indicate which window or door was opened, and where the burglar is at work.

Having thus described my invention,

I claim as new and desire to secure by Letters Patent—

1. The combination of the electro-magnets $B B^1$, &c., and armature-levers $L L^1$, &c., with the pins $d$, crank-axles $N N^1$, &c., springs $h$, and shields or indicators $f$, all arranged substantially as herein shown and described.

2. The swinging bars O, having the jaws $i$, and connected with each other by the rods $j$, in combination with the crank-axles $N N^1$, &c., all arranged as set forth.

CHAS. S. NOÉ

Witnesses:
GEO. W. MABEE,
ALEX. F. ROBERTS.